United States Patent [19]

Zimmermann

[11] Patent Number: 4,605,134
[45] Date of Patent: Aug. 12, 1986

[54] REINFORCED RECESSED POURER IN INSULATING JUG

[75] Inventor: Anso Zimmermann, Bad Hersfeld, Fed. Rep. of Germany

[73] Assignee: Rotpunkt Dr. Anso Zimmermann, Niederaula, Fed. Rep. of Germany

[21] Appl. No.: 716,034

[22] Filed: Mar. 26, 1985

[30] Foreign Application Priority Data

Apr. 2, 1984 [DE] Fed. Rep. of Germany ....... 3412209

[51] Int. Cl.4 ............................................. A47J 41/00
[52] U.S. Cl. ................................ 215/13 A; 215/12 A; 220/431
[58] Field of Search ................................ 220/431–434, 220/307, 326; 215/12 R, 12 A, 13 R, 13 A, 100 A, 100.5

[56] References Cited

U.S. PATENT DOCUMENTS

| | | | |
|---|---|---|---|
| 2,602,563 | 7/1952 | Lipski | 220/431 |
| 3,070,250 | 12/1962 | Bramming | 215/13 A |
| 3,358,875 | 12/1967 | Ekstrom | 220/307 |

FOREIGN PATENT DOCUMENTS

| | | | |
|---|---|---|---|
| 770449 | 10/1967 | Canada | 220/307 |
| 23705 | 2/1981 | European Pat. Off. | 220/432 |
| 1232608 | 10/1960 | France | 215/13 R |
| 19567 | of 1909 | United Kingdom | 215/13 A |
| 857503 | 12/1960 | United Kingdom | 215/13 A |
| 2039214 | 8/1980 | United Kingdom | 215/100 A |

Primary Examiner—William Price
Assistant Examiner—Gary E. Elkins
Attorney, Agent, or Firm—Scully, Scott, Murphy & Presser

[57] ABSTRACT

The subject of the invention is an insulating jug having a protective housing in which there is arranged an insulating insert held between a housing top part and a housing bottom part, having a handle, an opening which is sealable by a lid and a pourer which passes radially out through a cut-out portion in the housing casing of the protective housing. The object of the invention is to stabilize the protective casing of the zones on both sides of the cut-out portion which are weakened by the cut-out portion for the pourer. This is achieved in that there are provided on both sides of the cut-out portion (17) on the facing surfaces (13, 21) of the protective casing (6) and of the housing top part (4) extensions or recesses (21, 22) which interlock with surfaces which extend transversely to the peripheral direction.

According to an alternative solution, the edge (7) of the protective casing (6) on both sides of the cut-out portion (17) is encompassed on the inside and on the outside by lips (32) and projections (33) respectively of the housing top part (4) around an angle (W) of at least approximately 45° which is open to the cut-out portion (17).

3 Claims, 7 Drawing Figures

REINFORCED RECESSED POURER IN INSULATING JUG

TECHNICAL FIELD OF THE INVENTION

The subject of the invention is an insulating jug, and more particularly, an insulating jug with a reinforced, recessed pourer.

BRIEF DESCRIPTION OF THE PRIOR ART

Insulating jugs of this type are established in practice and therefore known. In the case of this known construction an insulating insert is held between a housing top part and a housing bottom part, the filling opening being arranged in the housing top part, and the pourer preferably issuing, in one piece, from the housing top part.

In order to reduce the overall height, there is provided in the case of the known construction on the top edge of the housing casing a cut-out portion through which the spout extends radially outwards. This development allows the overall height of the insulating jug to be reduced, namely by a substantial amount, yet the cutout portion greatly affects the strength of the housing casing, more particularly in the region of the edge on both sides of the cut-out portion.

It is usual to flange the top edge of the housing casing inwards and to provide on the housing top part which is enclosed in the housing casing locking latches or lugs which catch behind the inwardly directed free side of the flange. It has become apparent that even with securing means such as these the stability of the insulating jug is impaired to a great extent at the top, as, for assembly reasons, the locking latches cannot be developed so as to secure the edge of the housing casing radially inwards.

OBJECT OF THE INVENTION

The object underlying the invention is to find a simple development for an insulating jug of the design specified in the introduction, which provides stabilization of the insulating jug in the region of the cutout portion and stabilization of the securing means between the housing top part and the housing casing.

SUMMARY OF THE INVENTION

Two embodiments of the invention share the advantage that the bridge, or the closed annular shape of the top edge of the housing casing, which is missing due to the incorporation of the cut-out portion, is compensated. In one development according to the invention, there are provided on both sides of the cut-out portion on the facing surfaces of the housing casing and of the housing top part extensions or recesses which interlock with surfaces which extend transversely to the peripheral direction. This development means that the peripheral areas on both sides of the cut-out portion are secured in a form-locked manner on the housing top part, at least in a peripheral direction, so that these areas and corners of the housing edge are unable to bend outwards. The housing edge is therefore provided with the stability which it would have were the housing edge closed in itself, i.e. in the form of a ring. In the case of this solution, basically it is unimportant whether the housing top part encompasses the housing edge on the inside or on the outside. The stabilization which can be achieved by means of the development according to the invention also exists if the housing top part engages over the housing edge neither on the inside nor on the outside, but simply rests on the edge.

The same advantages are also obtainable by means of the second embodiment of the invention. With this solution the bridge which is missing in the region of the cut-out portion is not replaced directly, however, but the free corners of the housing edge which are formed by the cut-out portion are prevented, as a result of being encompassed by the housing top part on the inside and on the outside, from yielding radially, i.e. in a peripheral direction. Tests have shown that when the depth of the cut-out portion corresponds to conventional pourer sizes, it suffices for the housing edge on both sides of the cut-out portion to be overlapped over a radially-outwards open angle of at least approximately 45° on the inside and on the outside. This overlapping stabilizes the labile or unstable zones on both sides of the cut-out portion. Of course, it does no harm if the housing edge is overlapped according to the invention over an angle greater than 45°, e.g. right around.

The development according to one specific feature is advantageous for manufacturing reasons. In this development the pegs can be formed simply and economically by preforming, in one piece, the housing top part which consists of plastics material. The corresponding indentations or holes can be made more easily in the housing casing, e.g. by deep drawing or by punching.

The development according to another feature produces simple shapings which are advantageous for assembly reasons.

BRIEF DESCRIPTION OF THE DRAWING

Two exemplary embodiments of the invention are described in greater detail below, with reference to simplified drawings.

Figure 1:
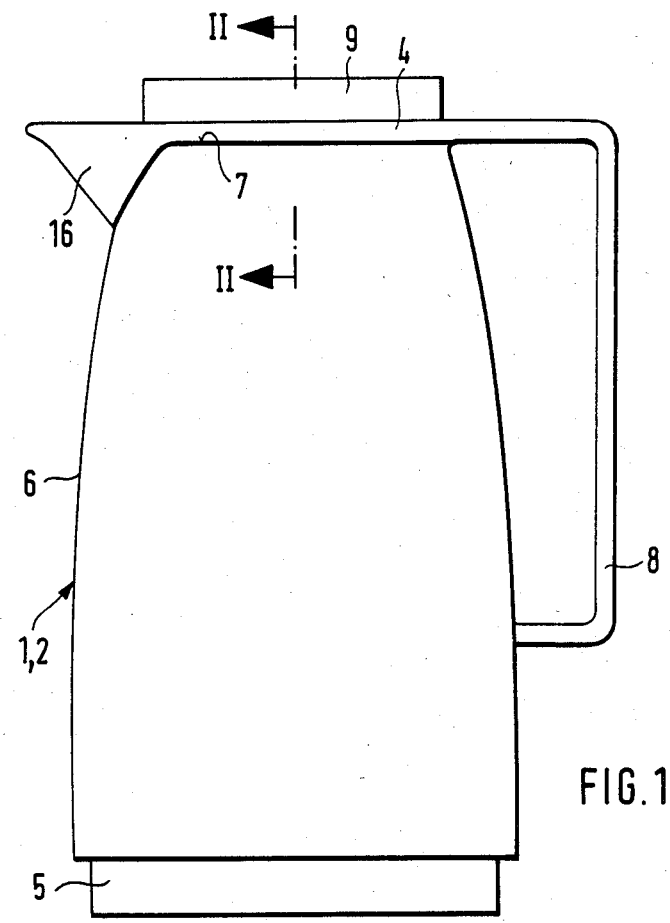
FIG. 1 shows a side view of an insulating jug developed according to the invention.
Figure 2:
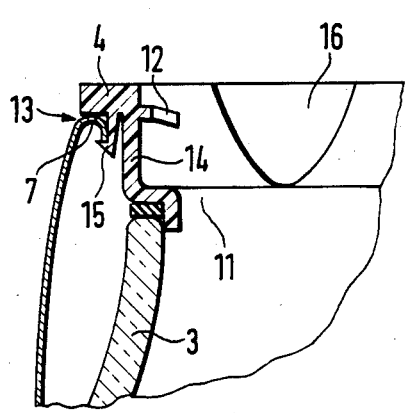
FIG. 2 shows a vertical partial section along line II—II in FIG. 1.

The insulating jug, designated generally 1 in FIG. 1, has a protective housing 2 in which there is arranged an insulating insert 3, represented in FIG. 2 only, which is held between a housing top part 4 and a housing bottom part 5. Between the housing top part 4 and the housing bottom part 5 there extends a housing casing 6, the housing top part 4 resting on its top edge 7. A handle 8 extends, in one piece, from the housing top part 4 and is secured at its bottom end to the housing casing 6 in a manner which is not shown. The insulating jug 1 also has a lid 9 which is represented in FIG. 1 only and by means of which the filling opening 11 arranged in the housing top part 4 can be closed. The lid 9 is a so-called screw-on lid with which there are associated threads 12 which are arranged segmentally on the housing top part 4.

FIG. 2 shows the known embodiment in which the housing casing 6 is inwardly flanged in the region of its edge 7. The flange is denoted with 13. The housing top part 4 is enclosed by means of an extension 14 on the underside in the housing casing 6 and is secured to the housing casing 6 by locking lugs or latches 15 which catch under the free side of the flange 13.

Figure 3:
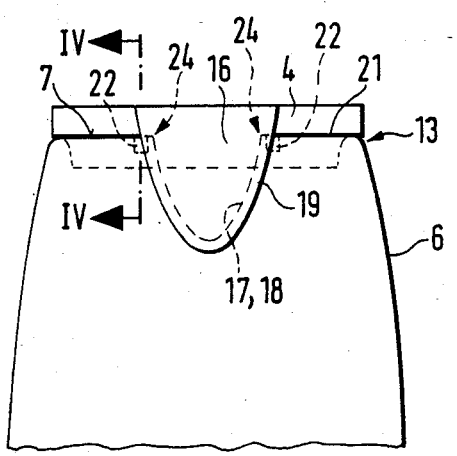
FIG. 3 shows a side view of the insulating jug viewed in the direction of the pourer.
Figure 5:
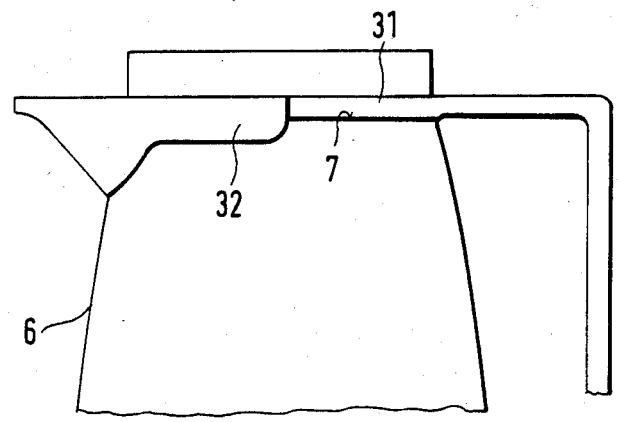
FIG. 5 shows a side view of the top of an insulating jug of the second embodiment.
Figure 6:
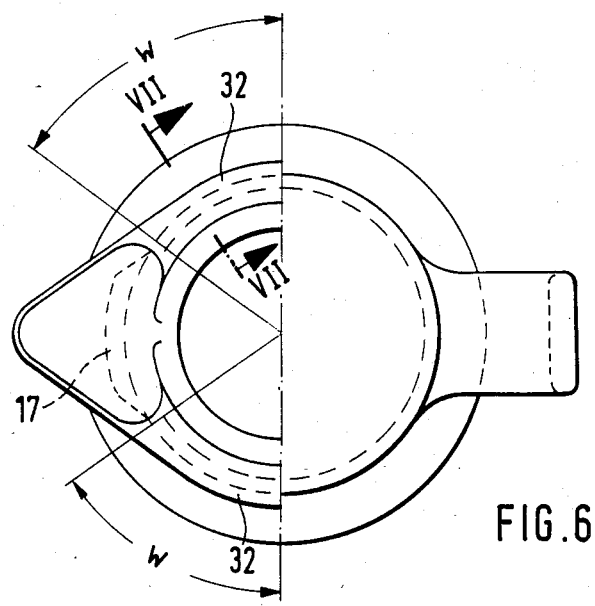
FIG. 6 shows a top view of the insulating jug according to FIG. 5.
Figure 7:
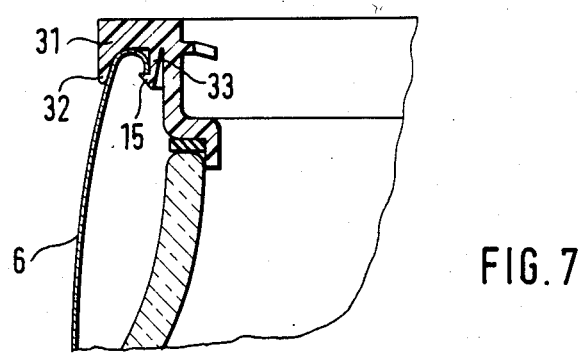
FIG. 7 shows a partial section along line VII—VII in FIG. 6.

There is preformed, in one piece, onto the housing top part 4 a pourer 16 which extends radially out through a cut-out portion 17, represented by broken lines in FIG. 3, of the housing casing 6 and which overlaps slightly, with a shoulder 19, the edge 18 of the cut-out portion 17. The housing casing 6 consists of sheet metal and the housing top part 4, inclusive of the locking lugs 15 which are preformed in one piece, consists of plastics material.

Figure 4:
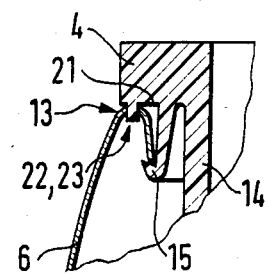
FIG. 4 shows a partial section along line IV—IV in FIG. 3.

An example of the development according to the invention is shown in FIGS. 3 and 4. There are arranged on the surface 21 of the housing top part 4 which face the edge 7 two pegs 22, preformed in one piece, the spacing between which matches two holes 23 which receive the pegs 22 in a substantially closed manner and which are disposed in the protective casing 6, namely in the upper region of the flange 13 on both sides of the cut-out portion 17, namely close to the free corners 24 of the edge 7 thereby formed. The engagement of the pegs 22 in the holes 23 compensates the instability of the protective casing 6 on both sides of the cut-out portion 17 and which is caused by the cut-out portion 17. The bridge which is missing due to the cut-out portion 17 is replaced by the housing top part 4, and the free corners 24 and also the connecting zones of the edge 7 are prevented from yielding both radially and in a peripheral direction.

FIG. 4 shows a slightly enlarged representation of the individual parts.

In the second exemplary embodiment, the housing top part, denoted here with 31, encompasses the edge 7 of the housing casing 6 on both sides of the cut-out portion 17 over an angle W of approximately 45° respectively. It is encompassed on the outside by a lip 32 issuing from the housing top part 4 and on the inside by the locking latches 15 which are already known from the first exemplary embodiment and which are developed on a thin-walled annular projection 33 on the underside of the housing top part 31.

The fact that the edge 7 of the housing casing 6 is encompassed on both sides prevents it from yielding in the region of its labile zone on both sides of the cut-out portion 17 both radially and in a peripheral direction.

Tests have established that when the depth of the cut-out portion 17 corresponds to conventional pourer cross-sections, encompassment over an angle of 45° respectively suffices. When the cut-out portions 17 are cut into a considerably greater depth, a larger angle of encompassment W becomes necessary. Of course, it is also possible to encompass the edge 7 over its entire length, i.e. right around. In this case, encompassment on the inside is necessary only in the unstable area on both sides of the cut-out portion 17.

What is claimed is:

1. An insulating jug including a reinforced recessed pourer, comprising a protective housing having a housing casing, a top housing part supported on said casing, and a bottom housing part; an insulating insert being arranged within said housing casing between said housing top part and said housing bottom part, said housing top part having a handle, an opening in said housing top part sealable by a lid, said pourer being formed on said top part and extending radially outwardly through a cut-out in the housing casing of said protective housing; and cooperating extensions and recesses being arranged on both sides of said cut-out on facing surfaces of, respectively, the housing top part and the housing casing, said extensions and recesses having interlocking surfaces extending transversely of a peripheral direction of said jug.

2. An insulating jug as claimed in claim 1, wherein said housing top part is constituted of a plastic material; said housing casing is constituted of metal, and said extensions comprise pegs integrally formed on the housing top part and which engage in said recesses in said housing casing.

3. An insulating jug as claimed in claim 1, wherein said housing casing has an upper inwardly flanged edge supporting the housing top part, and said extensions and recesses are spaced about an upper curved region of the flange.

* * * * *